United States Patent
Rey et al.

(10) Patent No.: US 12,190,025 B2
(45) Date of Patent: *Jan. 7, 2025

(54) ROUGH SURFACE MODEL FOR SHOOTING AND BOUNCING RAYS

(71) Applicant: ANSYS, INC., Canonsburg, PA (US)

(72) Inventors: Daniel R. Rey, Evanston, IL (US); Stefano M. Canta, Skokie, IL (US); Robert A. Kipp, Hinsdale, IL (US)

(73) Assignee: ANSYS, INC., Canonsburg, PA (US)

(*) Notice: Subject to any disclaimer, the term of this patent is extended or adjusted under 35 U.S.C. 154(b) by 1112 days.

This patent is subject to a terminal disclaimer.

(21) Appl. No.: 16/869,508

(22) Filed: May 7, 2020

(65) Prior Publication Data
US 2021/0350044 A1    Nov. 11, 2021

(51) Int. Cl.
*G06F 30/20*  (2020.01)
*G01S 7/40*   (2006.01)
(Continued)

(52) U.S. Cl.
CPC ............. *G06F 30/20* (2020.01); *G06F 17/18* (2013.01); *G01S 7/4052* (2013.01); *G06F 30/15* (2020.01);
(Continued)

(58) Field of Classification Search
None
See application file for complete search history.

(56) References Cited

U.S. PATENT DOCUMENTS

| | | | | |
|---|---|---|---|---|
| 4,548,506 A | * | 10/1985 | Elson | G01B 11/303 356/446 |
| 6,114,985 A | * | 9/2000 | Russell | G01S 7/4052 342/173 |

(Continued)

FOREIGN PATENT DOCUMENTS

WO   WO-2020068244 A2 * 4/2020 ............. G06F 30/10

OTHER PUBLICATIONS

L. Tsang et al, "Electromagnetic Computation in Scattering of Electromagnetic Waves by Random Rough Surface and Dense Media in Microwave Remote Sensing of Land Surfaces," in Proceedings of the IEEE, vol. 101, No. 2, pp. 255-279, Feb. 2013, doi: 10.1109/JPROC.2012.2214011 (Year: 2013).*

(Continued)

*Primary Examiner* — Akash Saxena
(74) *Attorney, Agent, or Firm* — Womble Bond Dickinson (US) LLP

(57) ABSTRACT

A method is disclosed for augmenting the SBR model used in EM field simulation by modeling the specular coherent and diffuse incoherent components of the field scattered by rough surfaces using statistical characteristics of surface roughness. For each projected ray-tube footprint, the magnitude of the coherent radiated field is attenuated with a scalar factor, while the incoherent radiated field is modulated by a random magnitude and phase. Both corrections are based on the statistical characteristics of surface roughness. Multiplying the incoherent field with a randomly generated phase renders it in a mathematically coherent form, which allows the method to generate a statistically viable instance of the total (i.e. coherent plus incoherent) field scattered by a rough surface. The results reproduce the field and power statistics (i.e. mean and variance) observed from direct SBR simulations using an ensemble of explicitly (Continued)

rendered rough surface geometry models, with a significant reduction in computation.

25 Claims, 10 Drawing Sheets

(51) Int. Cl.
 G06F 17/18 (2006.01)
 G06F 30/15 (2020.01)
 G06F 30/367 (2020.01)
 G06F 111/08 (2020.01)
(52) U.S. Cl.
 CPC ........ *G06F 30/367* (2020.01); *G06F 2111/08* (2020.01)

(56) References Cited

U.S. PATENT DOCUMENTS

| | | | | |
|---|---|---|---|---|
| 6,580,388 | B1* | 6/2003 | Stoyanov | G01S 7/411 342/195 |
| 7,424,408 | B1* | 9/2008 | Crabtree | G01S 7/4052 703/2 |
| 8,242,952 | B1* | 8/2012 | Barr | G01S 7/412 342/55 |
| 11,313,949 | B2* | 4/2022 | Kipp | G01S 7/4052 |
| 2003/0167156 | A1* | 9/2003 | Alba | G06F 30/20 703/2 |
| 2005/0206890 | A1* | 9/2005 | Hurst | G06T 7/62 356/239.7 |
| 2006/0285640 | A1* | 12/2006 | Nizin | G06F 30/00 378/65 |
| 2010/0066592 | A1* | 3/2010 | Lee | G01S 7/4021 342/175 |
| 2010/0066595 | A1* | 3/2010 | Lee | G01S 7/412 342/179 |
| 2010/0109941 | A1* | 5/2010 | Vacus | G01S 7/41 342/179 |
| 2013/0208850 | A1* | 8/2013 | Schmitt | G01N 23/203 378/4 |
| 2017/0363719 | A1* | 12/2017 | Ahmed | G01S 7/4052 |
| 2019/0339318 | A1* | 11/2019 | Liu | G01R 29/10 |
| 2019/0355601 | A1* | 11/2019 | Danen | G06F 30/23 |
| 2020/0158855 | A1* | 5/2020 | Blanche | G01S 13/9011 |
| 2020/0349306 | A1* | 11/2020 | Bruno | G06F 30/23 |
| 2021/0350044 | A1* | 11/2021 | Rey | G06F 30/20 |
| 2023/0099845 | A1* | 3/2023 | Cai | G01S 7/4052 703/6 |
| 2023/0102079 | A1* | 3/2023 | Cai | G01S 7/4052 342/174 |
| 2023/0113723 | A1* | 4/2023 | Rey | G06F 30/20 703/2 |
| 2023/0117339 | A1* | 4/2023 | Cai | G01S 7/4052 342/169 |

OTHER PUBLICATIONS

A. M. Marzougui et al., "Scattering from rough surfaces using the 'shooting and bouncing rays' (SBR) technique and comparison with the method of moments solutions," International Symposium on Antennas and Propagation Society, Merging Technologies for the 90's, Dallas, TX, USA, 1990, pp. 1540-1543 (Year: 1990).*

R. L. Wagner, Jiming Song and W. C. Chew, "Monte Carlo simulation of electromagnetic scattering from two-dimensional random rough surfaces," in IEEE Transactions on Antennas and Propagation, vol. 45, No. 2, pp. 235-245, Feb. 1997, doi: 10.1109/8.560342. (Year: 1997).*

D. L. Setterdahl, R. A. Kipp and M. C. Miller, "Signa: A radar signature prediction tool for electrically large targets," 2014 IEEE Radar Conference, Cincinnati, OH, USA, 2014, pp. 0083-0087, doi: 10.1109/RADAR.2014.6875560. (Year: 2014).*

Eric I. Thorsos; The validity of the Kirchhoff approximation for rough surface scattering using a Gaussian roughness spectrum. J. Acoust. Soc. Am. Jan. 1, 1988; 83 (1): 78-92. https://doi.org/10.1121/1.396188 (Year: 1988).*

Rui Wang, Guangbin Guo, Lixin Guo, "Study of the Terahertz Wave Scattering From Metal Surface Coated by Rough Lossy Coating Based on a Ray Tracing Modeling", IEEE Access, vol. 7, pp. 116799-116808, 2019. (Year: 2019).*

W. Gao, Z. Liang, J. Fang and Y. Liao, "Non-uniform triangulation technique in the shooting and bouncing ray method," 2013 5th IEEE International Symposium on Microwave, Antenna, Propagation and EMC Technologies for Wireless Communications, Chengdu, China, 2013, pp. 272-274 (Year: 2013).*

J. T. Johnson and R. J. Burkholder, "A study of scattering from an object below a rough surface," in IEEE Transactions on Geoscience and Remote Sensing, vol. 42, No. 1, pp. 59-66, Jan. 2004 (Year: 2004).*

H. J. Mametsa, A. Berges and N. Douchin, "Improving RCS and ISAR image prediction of terrestrial targets using random surface texture," 2009 International Radar Conference "Surveillance for a Safer World" (RADAR 2009), Bordeaux, France, 2009, pp. 1-5 (Year: 2009).*

\* cited by examiner

Slightly rough asphalt

$\sigma = 0.39mm$
$\ell = 2.1mm$

Flat asphalt

$\sigma = 0$

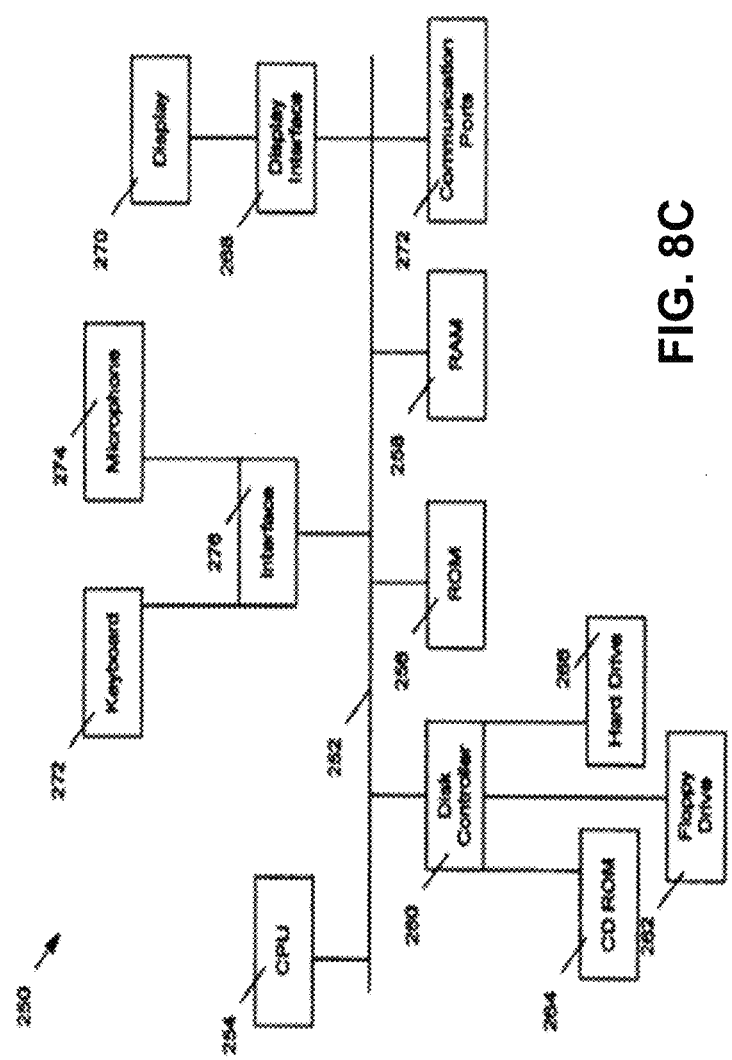

ROUGH SURFACE MODEL FOR SHOOTING AND BOUNCING RAYS

BACKGROUND

The growing popularity of portable low-power radio-frequency (RF) electronic devices has increased the demand for practical electromagnetic (EM) simulation tools, which model the scattering effects from objects in a large complex environment on fields emanating from one or more transmitting antennas. Such tools predict the observed EM fields at various spatial locations, as well the coupled signal (i.e. voltage response) at one or more receiving antennas. They may be used to model a broad spectrum of applications including: range Doppler radars, inverse synthetic aperture radars (ISAR), frequency modulation continuous-wave (FMCW) radars, etc.

One common EM simulation technique specifically designed to solve large-scale problems involving complex 3D geometries is known as Shooting and Bouncing Rays (SBR). The SBR methodology is based on ray-tracing, which makes it particularly well-suited for large-scale problems such as modeling indoor/outdoor fifth-generation (5G) wireless propagation, or for a variety of target ranging detection and identification tasks, which are now routinely performed by autonomous vehicles. Conventional SBR however, has a key limitation in that it considers only coherent scattering effects. That is, it assumes all surfaces may be treated as electrically smooth, so therefore any surface height fluctuations are much smaller than the wavelength $\lambda$ associated with the highest simulation frequency and can be ignored. However, as the operational frequency of RF devices increases, the modeling of surface roughness effects becomes crucial. For instance, a typical 77 GHz radar has a wavelength of roughly four millimeters, which is of the same order of magnitude of the surface height fluctuations present in roads, buildings, terrain, etc. Under these conditions, such surfaces cannot be considered smooth, as they no longer reflect the EM wave coherently, like a mirror. Rather, the scattered field or energy consists of a coherent component and a diffuse incoherent component. Accurate simulation requires properly modeling the effects of the surface roughness—ignoring them would be tantamount to assuming pavement can be modeled as a thick sheet of mirrored glass.

Addressing these limitations requires augmenting the SBR methodology with a rough surface scattering model. While SBR can explicitly model the scattering effects due to rough surfaces down to the millimeter scale, such as by modeling the microscopic surface details in the input 3D geometry, this solution is computationally impractical for large simulation environments, which may span thousands of meters (millions of wavelengths).

SUMMARY

The disclosure describes a method to adapt the SBR technique to include scattering effects from rough surfaces. The method characterizes surface roughness statistically, rather than performing direct simulation in SBR using an explicitly rendered rough surface model. The method combines models of the coherent (specularly reflected and possibly transmitted) and incoherent (diffuse) scattered fields due to surface roughness to accurately reproduce the statistical distribution of scattered fields observed from direct SBR simulation using an ensemble of explicitly rendered rough surfaces. In other words, the coherent sum of the coherent and the incoherent components of the scattered field which are modeled based on the statistical characteristics of the surface roughness, generates a statistically viable instance of the total (i.e. coherent plus incoherent) scattered fields. That is, the mean and the variance of the total (i.e., coherent plus incoherent) field and power of the scattered fields agree with results observed from direct SBR simulation using an ensemble of explicitly rendered rough surface geometry models.

The model for the incoherent field includes both amplitude and phase for compatibility with SBR. In SBR, the incident EM wave from a radiation source may be modeled as an ensemble of volumetric ray-tubes that transport the EM field from the radiation source to a scene object. The fields on the rough surface may be modeled by considering the footprints of these ray-tubes, also known as ray-tube footprints, projected onto the surface of the object. The incoherent field for each projected ray-tube footprint is modulated by a random amplitude and phase, which is chosen in such a way that the mean incoherent field power scales linearly with the aggregate area of the projected ray-tube footprints. This scaling law is physically consistent, and agrees with results observed from direct simulation by performing the SBR method on an ensemble of explicitly rendered rough surface geometry models. In one embodiment, the method models the phase and amplitude correlations of the incoherent fields across frequencies and far-field observation angles. By modeling these correlations in the incoherent field in this way, the second order statistics (e.g., variance) of the incoherent field power agree with the results from direct simulation on an ensemble of explicitly rendered rough surface models.

The coherent field radiated by each projected ray-tube footprint in SBR is modeled by first computing the equivalent surface currents induced by the incident field (in accordance with the EM properties of the surface material) and then radiating these currents assuming constant magnitude and a linear phase progression across the footprint. These fields are attenuated with a scalar factor to account for the surface roughness. The scalar factor may be a function of the statistical properties of the surface roughness and the incident and scattered angles of the EM wave. The reflected and transmitted coherent Geometrical Optics (GO) fields attenuated due to surface roughness are then propagated to the next bounce, in accordance with the multi-bounce ray tracing framework of SBR.

In one embodiment, a method for computer-aided simulation of EM waves scattered by a rough surface model is disclosed. The method includes calculating a coherent component of a scattered field caused by an incident EM field on the surface of an object based on statistical parameters of surface roughness of the object. The method also includes calculating an incoherent component of the scattered field based on the statistical parameters of surface roughness of the object. The incoherent component of the scattered field is modulated by a random amplitude and phase that are functions of the statistical roughness properties of the surface. The method then coherently combines the coherent component and the incoherent component to generate a statistically viable instance of the total (i.e. coherent plus incoherent) scattered fields.

In one embodiment, a method is disclosed to simulate EM wave scattering by an object using the SBR technique augmented with a rough surface model that includes coherent and incoherent scattered fields based on statistical characteristics of surface roughness. The method includes receiving the description of the 3D model of an object. The 3D CAD model may include the statistical characteristics of surface roughness of the object. The method also includes the calculation of the geometrical-optics (GO) field from a radiation source over a ray-tube footprint projected on the surface of the object. The GO field may include an incident field, reflected field, and if the surface materials of the object are penetrable, a transmitted field. The method may further calculate equivalent electric and magnetic currents induced by the GO field according to physical optics (PO) approximation. The method further includes calculating a coherent component of the scattered field based on the statistical roughness characteristics of the object surface by applying an attenuation factor to the field radiated by the equivalent currents. The method further includes calculating the incoherent component of the scattered field based on the GO field and the statistical roughness characteristics by randomizing its amplitude and phase. The method further incorporates calculating the coherent combination of the coherent and the incoherent components of the scattered field to generate a statistically viable instance of the total (i.e. coherent plus incoherent) scattered fields. The method also includes attenuating the GO field (reflected field and possibly the transmitted field) based on the statistical characteristics of the object surface and propagating the attenuated GO reflected and transmitted fields to the next bounce, in accordance with the multi-bounce ray tracing framework of SBR.

BRIEF DESCRIPTION OF THE DRAWINGS

The present disclosure is illustrated by way of example and not limitation in the figures of the accompanying drawings, in which like references indicate similar elements and in which:

FIGS. 7, 8A, 8B, and 8C illustrate example systems which may be used in conjunction with the embodiments described herein.

DETAILED DESCRIPTION

A technique is disclosed to augment the SBR model for EM field simulation to include surface roughness effects on field scattering. The SBR model typically only considers coherent scattering from smooth surfaces, effectively treating all surfaces as partially reflective, perfectly smooth mirrors. To accurately simulate rough surfaces with height fluctuations comparable to the smallest simulation wavelength, the SBR model may be augmented to model the scattered field due to surface roughness. Disclosed is a method to model the coherent component and the diffuse incoherent component of the scattered field using a statistical characterization of surface roughness rather than explicitly instantiating the surface roughness in the CAD model. The method performs high-frequency EM simulation using the augmented SBR model in a way that is statistically accurate, memory efficient, and computationally practical to permit fast simulation (i.e., without the need to explicitly instantiate the surface roughness). The statistical characterization of the surface roughness may include parameters such as the standard deviation σ and the correlation length l. The σ may represent the root-mean-squared (RMS) deviation of surface height from being perfectly smooth. The l may represent a parameterized value of the autocorrelation function of the surface height fluctuations across a horizontal length of the surface. For simplicity, the examples presented here use a Gaussian autocorrelation function parameterized by correlation length l. Other choices may be used however, such as an exponential autocorrelation function parameterized by an exponent. The appropriate choice of this statistical description depends on the material being modeled.

The method coherently sums the coherent and incoherent scattered field components to generate a statistically viable instance of the total (i.e. coherent plus incoherent) scattered fields. The mean and the variance of the total (i.e., coherent plus incoherent) scattered fields are validated by direct SBR simulation using an ensemble of explicitly rendered rough surface geometry models. The SBR model augmented with the statistical characterization of surface roughness is computationally practical compared to explicitly modeling the surface roughness when applied to large-scale EM simulation involving large complex 3D geometries such as those encountered in 5G and autonomous vehicle radar scene imaging applications or generic field sampling in radar cross-section applications.

Figure 2:
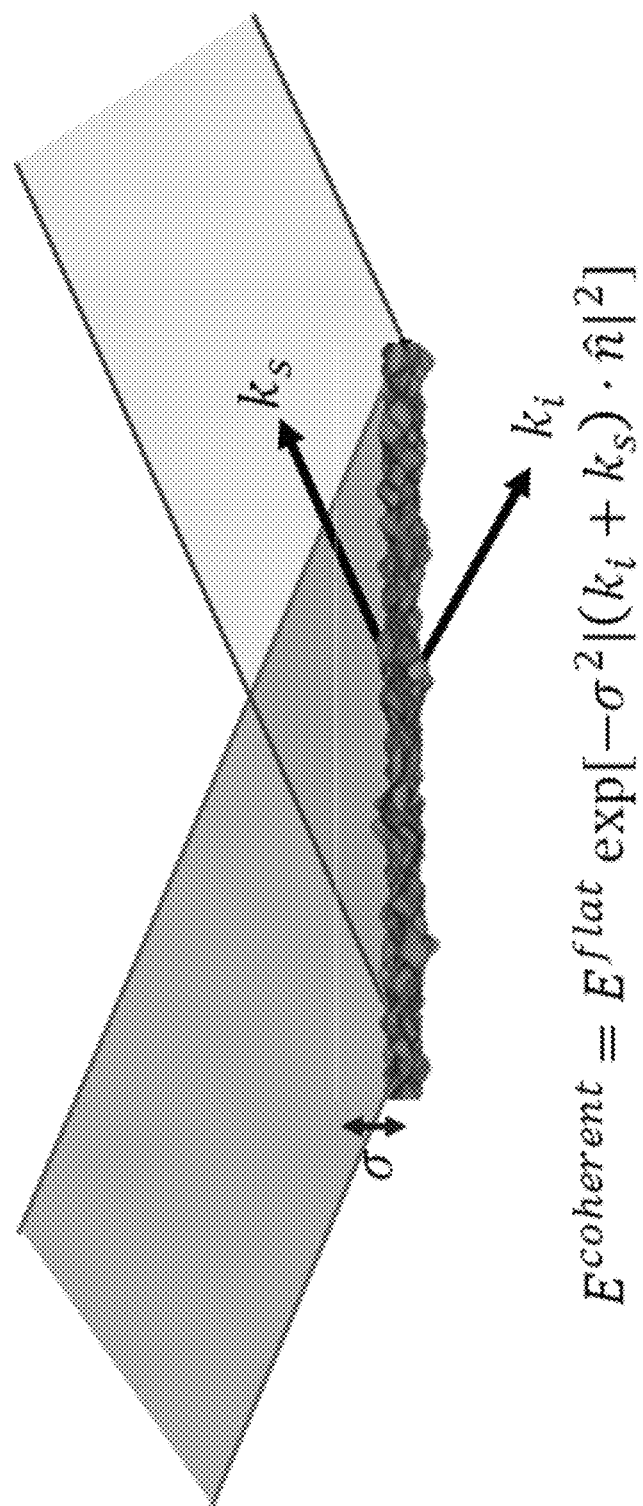
FIG. 2 illustrates in profile the reflection of a volumetric ray-tube incident on a rough surface for an analytical model of the attenuated coherent field in accordance with one embodiment of the disclosure.

The incident EM wave from a radiation source is modeled in SBR as a collection of volumetric ray-tubes that transport the EM field from the radiation source to a scene object. Each ray-tube has a finite two-dimensional cross-section perpendicular to the ray travel direction. The ray-tube cross-sectional area can grow or shrink along the direction of ray travel, depending upon details of the radiation source and also the scattering geometry when a ray reflects off one or more surfaces. The ray-tube cross-sectional shape can also change along the direction of ray travel, depending on these same factors. When a ray obliquely hits a surface, the ray-tube cross-section intersects the surface over a range of ray travel distances, resulting in a projected area and shape on the surface that matches that of the ray-tube cross-section in the lateral direction along the surface relative to the incident ray direction and that is stretched relative to the ray-tube cross-section in the longitudinal direction along the surface relative to the incident ray direction, with the degree of stretching proportional to the angular deviation of the surface-incident ray from the surface perpendicular. This projection of the ray-tube cross-section on to the hit surface is known as a ray footprint or a ray-tube footprint. FIG. 2 illustrates the stretching of the projected ray footprint relative to the ray cross-section. In FIG. 2, one of the two dimensions of the ray tube cross-section has been collapsed into the page, resulting in a two-dimensional depiction of the volumetric ray tube, and the lateral direction relative to the incident ray is perpendicular to the page. The fields on the rough surface may thus be modeled by considering the footprints of these ray-tubes projected onto the surface of the object. The size of a projected ray-tube footprint is assumed to be large enough (relative to the correlation length of the surface height fluctuations of the rough surface) so that phase across neighboring rays can be assumed to be perfectly decorrelated and an ensemble-averaged response can be used to model the incoherent scattered field. With this assumption, the incoherent field for each projected ray-tube footprint may be assigned a random amplitude and phase that is statistically independent with respect to the values assigned to neighboring projected ray-tube footprints. These random values may be drawn from a known distribution, which in general may be a function of incident GO field, the incident and scattered azimuth and polar angles, geometry of the projected ray-tube footprint, the statistical characterization of surface roughness such as the standard deviation $\sigma$ of surface height fluctuation and its autocorrelation function, and the electrical properties of the surface materials. Scaling the modeled incoherent field with a random amplitude and phase drawn for each projected ray-tube footprint produces an average incoherent field power that scales linearly with the aggregate area of the projected ray-tube footprints (i.e., the average field magnitude scales with the square root of the aggregate area). The mean incoherent field power scattered from the rough surface using the statistical characterization of surface roughness may be shown to reproduce the results from direct SBR simulations using an ensemble of explicitly rendered rough surface geometry models. The coherent sum of the coherent and incoherent components of the scattered field calculated based on the statistical characterization of surface roughness also accurately reproduces the field and power statistics (i.e., the mean and the variance) of the total (i.e., coherent plus incoherent) scattered fields observed from direct SBR simulations using an ensemble of explicitly rendered rough surface geometry models.

Signal post-processing operations such as range Doppler or ISAR image formation may require modeling the amplitude and phase correlations of the incoherent field across frequency bands and observation angles. These correlations are in general a function of the incident and scattered polar angles, the incident and scattered azimuth angles, the surface roughness parameters, the EM properties of the material, and the geometry of the projected ray-tube footprint. To avoid costly computation, these correlations may be pre-computed. Then during simulation, the method may interpolate these pre-computed values over frequencies and far-field observation angles, rescaling the values accordingly to match the geometry of a given projected ray-tube footprint. When properly modeled, these correlations of the incoherent field magnitude and phase reproduce an incoherent field whose second order statistics (i.e. variance of the incoherent field amplitude) match results obtained from direct SBR simulation using an ensemble of explicitly rendered rough surface geometry models, and whose mean and variance are independent of the spatial ray-density of the projected ray-tube footprints.

The coherent field radiated by each projected ray-tube footprint is modeled using an SBR shape function, which approximates the radiation integral over the footprint assuming an induced surface current density with constant magnitude and linear phase progression. The amplitude of the coherent field is attenuated by an observation angle-dependent scalar factor that is a function of the surface height standard deviation $\sigma$, and the incident and scattered polar angles. In one embodiment, the scalar attenuation factor may also be a function of the correlation length l. The attenuated reflected and transmitted GO fields are then propagated to the next bounce, in accordance with the multi-bounce ray tracing framework of SBR.

Figure 1B:
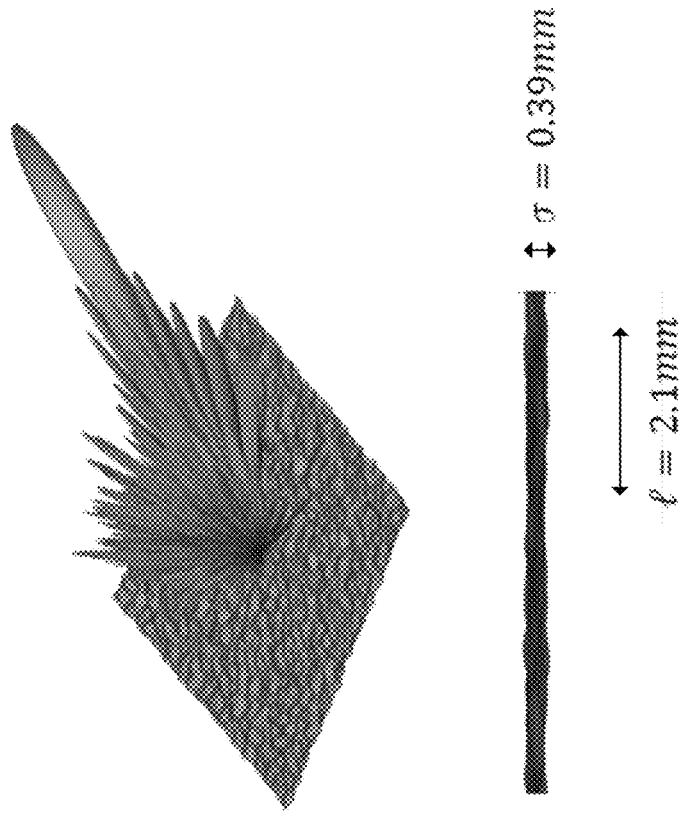
FIG. 1B illustrates qualitatively the scattered field from a plane wave incident on a slightly rough asphalt surface characterized by surface height standard deviation σ of 0.39 mm and a Gaussian autocorrelation function with correlation length l of 2.1 mm.
Figure 1A:
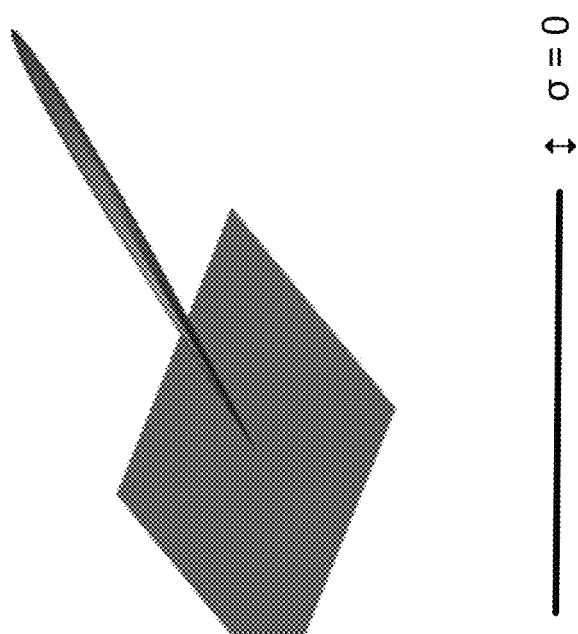
FIG. 1A illustrates qualitatively the scattered field from a plane wave incident on a perfectly flat asphalt surface.

FIG. 1A illustrates qualitatively the scattered field from a plane wave incident on a perfectly flat asphalt surface. The standard deviation $\sigma$ in the surface height fluctuations of the flat asphalt surface is 0, so the scattered field includes only a coherent reflected component. FIG. 1A depicts the scattered field from a conventional SBR model, which assumes surface height fluctuations are much smaller than the smallest simulation wavelength. The scattered field is purely coherent by effectively treating all surfaces as partially reflective, perfectly smooth mirrors.

Figure 1C:
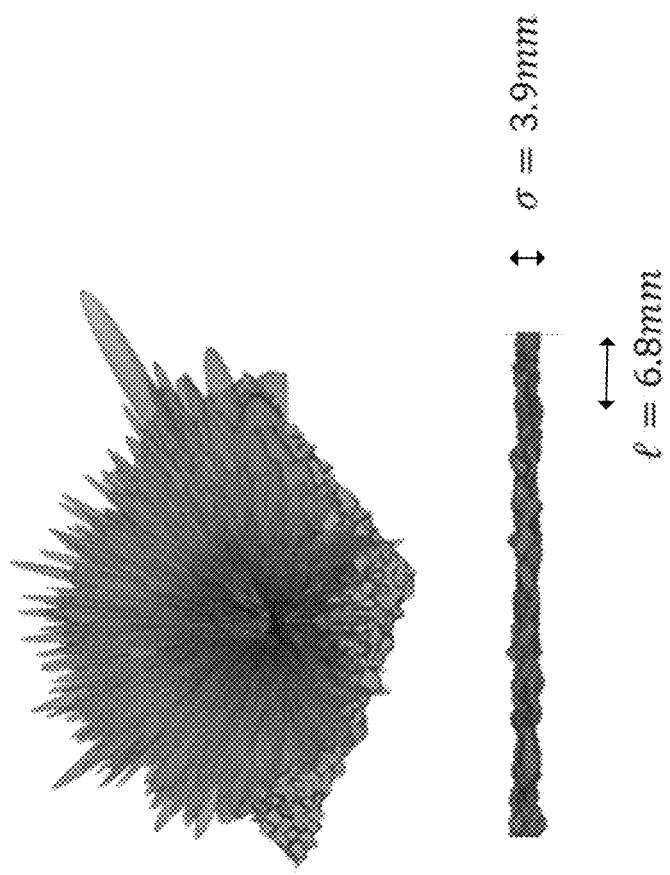
FIG. 1C illustrates qualitatively the reduced reflected coherent component and the augmented diffuse incoherent component of the scattered field from a plane wave incident on a rough asphalt surface characterized by surface height standard deviation σ of 3.9 mm and correlation length l of 6.8 mm.

FIG. 1B illustrates qualitatively the scattered field from a plane wave incident on a slightly rough asphalt surface characterized by surface height standard deviation $\sigma$ of 0.39 mm and a Gaussian autocorrelation function of the surface height fluctuations with correlation length l of 2.1 mm. FIG. 1C illustrates qualitatively the reduced reflected coherent component and the augmented diffuse incoherent component of the scattered field from a plane wave incident on a rough asphalt surface characterized by surface height standard deviation $\sigma$ of 3.9 mm and correlation length l of 6.8 mm. The standard deviation $\sigma$ of surface height fluctuations of the rough asphalt surface in FIG. 1C is an order of magnitude larger than that of the smooth asphalt surface of FIG. 1B. The asphalt surface may be tessellated into a collection of projected ray-tube footprints. The size of each projected ray-tube footprint may be assumed to be larger than the correlation length l so that the phase across adjacent ray-tubes may be assumed to be perfectly decorrelated. Under this assumption, the amplitude and phase assigned to the incoherent scattered field may be modeled with a random value drawn from a known distribution, and this random value may be considered statistically independent of the random values assigned to neighboring ray-tube footprints.

The field scattered from a rough surface is modeled to include both a diffuse incoherent component as well as a specular coherent component. The power radiated by the coherent component in FIG. 1B is reduced compared to that of the flat surface of FIG. 1A. The power radiated by the coherent component in FIG. 1C is further reduced compared with that of FIG. 1B. This reduction in coherent field strength is modeled with a scalar attenuation factor, which may depend on the incident and scattered polar angles and the standard deviation $\sigma$ of surface height fluctuations. In one embodiment, the scalar attenuation factor may also be a function of the correlation length l. The phase of the coherent field component is unchanged, and corresponds to the phase of the EM field as radiated by a flat surface. In one embodiment, the scalar attenuation factor may be expressed as:

$$\exp[-\tfrac{1}{2}\sigma^2 k^2(\cos[\theta_i]+\cos[\theta_s])^2] \in [0,1] \quad \text{(Eq. 1)}$$

where $\theta_i$ and $\theta_s$ are respectively the incident and scattered polar angles measured from the smooth-surface normal, k is the wave number (i.e., angular frequency divided by speed of light), and $\sigma$ is the standard deviation of the surface height fluctuations.

Any radiated energy that is not coherently reflected is transferred to the incoherent component of the scattered field and assigned a random amplitude and phase in the statistical scattering model. In one embodiment, the distribution of the random amplitude of the incoherent component in general may be a function of the incident GO field, the incident and scattered azimuth and polar angles, standard deviation $\sigma$ and correlation length l of surface height fluctuations, and the EM properties of the surface materials (e.g., Fresnel coefficients). The amplitude of the incoherent field for a projected ray-tube footprint may be modeled analytically, phenomenologically, or empirically, and then modulated by a random value. Each approach has its own strengths and weaknesses in terms of accuracy and computational efficiency. In FIG. 1C, the majority of the radiated power is scattered incoherently.

Regardless of how the incoherent field amplitude is modeled, the field may be assigned a random phase as well as the random amplitude. This ensures that the field amplitude is Rayleigh distributed, so that its mean power scales linearly with the aggregate area of the projected ray-tube footprints, and is independent of the spatial ray-density of the projected ray-tube footprints. In one embodiment, this distribution for the random amplitude and phase may be a function of the incident GO field, the incident and scattered azimuth and polar angles, the geometry of the projected ray-tube footprint, as well as the statistical and electrical properties of the rough surface. The augmented SBR model may implement this randomization in different ways, each of which may produce a different statistical distribution of the scattered field. For instance, modulating the incoherent field with a random amplitude and phase per each scattered field observation angle may over-predict the decorrelation of the incoherent field across neighboring far-field angles and may introduce too much noise to perform some post-processing operations (e.g., angle-of-arrival processing, ISAR imaging, etc.). On the other hand, choosing a single random value for the amplitude and phase per projected ray-tube footprint may produce clean ISAR images but under-predict the noise contribution from the incoherent field.

In one embodiment, the augmented SBR model may pre-compute amplitude and phase correlations of the incoherent field as a function of the incident and scattered azimuth and polar angles, the surface roughness statistics, and the EM properties of the surface material. The augmented SBR model may then interpolate this pre-computed distribution over frequencies and far-field observation angles, rescaling the values accordingly to match the geometry of a given projected ray-tube footprint. When these correlations are properly modeled in this way, the first and second order statistics (i.e. mean and the variance) of the incoherent field power scattered from the rough surface both match the results obtained from direct SBR simulation using an ensemble of explicitly rendered rough surface geometry models, and are independent of the spatial ray-density of the projected ray-tube footprints.

FIG. 2 illustrates in profile the reflection of a volumetric ray-tube incident on a rough surface. The analytical model of the attenuated coherent field is given in accordance with one embodiment of the disclosure. The field FP' is the coherent field radiated by the SBR shape function, which assumes a flat surface with constant field amplitude and linear phase-progression across the projected ray-tube footprint. To model the surface roughness, the coherent field $E^{flat}$ is multiplied by an attenuation factor such as the scalar attenuation factor of Eq. 1 to generate the coherent field $E^{coherent}$ reflected from the rough surface. The scalar attenuation factor may be a function of the standard deviation $\sigma$ of the surface height fluctuations, the incident wave vector $k_i$, and the scattered wave vector $k_s$. In one embodiment, the scalar attenuation factor may also be a function of the correlation length l. The scalar attenuation factor reduces the radiated field power of the coherent field component while preserving its coherent phase generated from the SBR shape function. The attenuated coherent reflected and transmitted geometrical-optics (GO) fields are then propagated by ray transport to the next bounce point, in accordance with the multi-bounce ray tracing framework of SBR.

Figure 3:
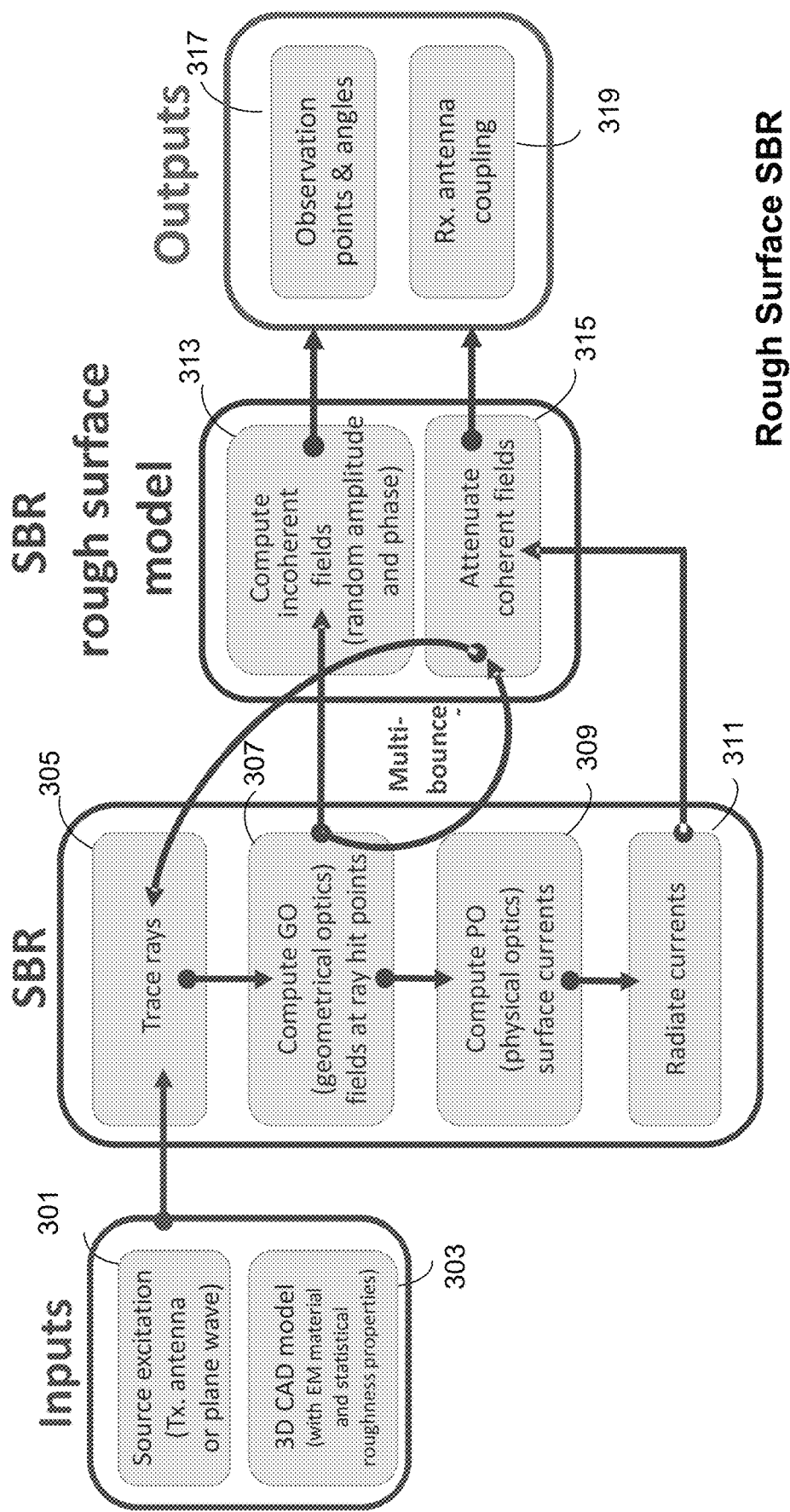
FIG. 3 illustrates a processing flow of the SBR technique augmented with a rough surface model that include models of the incoherent field with a randomly modulated amplitude and phase, as well as an attenuated coherent field used for multi-bounce ray tracing in accordance with one embodiment of the disclosure.

FIG. 3 illustrates a processing flow of the SBR technique augmented with a rough surface model that includes analytical models of an incoherent field with random amplitude and phase, and an attenuated coherent field used for multi-bounce ray-tracing in accordance with one embodiment of the disclosure. The inputs to the augmented SBR model include an excitation or radiation source 301 (typically a Tx antenna or incident plane-wave). The inputs also include 3D CAD model 303 of objects in the simulation environment, together with the EM properties and the statistical characterization of surface roughness of the objects.

The augmented SBR model traces volumetric ray-tubes emanating from the source excitation at 305. These ray-tubes are projected onto the illuminated area of the input CAD model. In one embodiment, the number of rays is chosen to achieve a target ray-density per wavelength of the projected ray-tubes. The geometrical-optics (GO) EM field is evaluated at the hit-point associated with each of the first-bounce projected ray-tube footprints visible from the radiation source at 307. Using these fields and the EM properties of the surface material, equivalent electric and magnetic currents induced by the GO field are computed at each projected ray-tube footprint according to the physical-optics (PO) approximation at 309. The equivalent currents are then radiated to far-field observation angles, near-field observation points, or receiving antennas, assuming constant current amplitude and linear phase progression across the projected ray-tube footprint at 311.

For rays that hit rough surfaces, the SBR rough surface model splits the ray footprint radiation integral into coherent and incoherent components. For the coherent component, the SBR rough surface model at 315 may apply an attenuation factor (e.g., Eq. 1) to the field radiated by the equivalent currents as discussed in FIG. 2. The attenuation factor reduces the radiated field magnitude while preserving its coherent phase. The attenuated coherent transmitted and reflected GO fields are then propagated by ray transport to the next bounce.

The incoherent component of the scattered field is modeled at 313 with a random amplitude and phase as discussed in FIG. 1B and FIG. 1C. The random amplitude and phase distribution may be represented as a function of the incident GO field, the incident and scattered azimuth and polar angles, the geometry of the projected ray-tube footprint, as well as the statistical characteristics of the surface roughness and the EM properties of the surface material. In one embodiment, the SBR rough surface model may pre-compute the correlations in amplitude and phase and interpolate the resulting distribution over simulation frequencies and far-field observation angles, rescaling the values accordingly to match the geometry of a given projected ray-tube footprint.

The SBR model may trace a new ray for a reflected direction from each hit point according to Snell's law. The reflected ray-tube transports the attenuated reflected coherent GO field to the next hit point. In one embodiment, if the hit surface of the object is a penetrable stack of dielectric layers, then a transmitted ray may be launched separately, using the attenuated transmitted coherent GO field. For each new ray-tube that hits a new surface, a new projected ray-tube footprint is computed. The electric and magnetic GO fields may be propagated by ray transport to the new hit point of the new projected ray-tube footprint. The SBR model augmented with the rough surface model may compute the equivalent currents according to the PO approximation at the new projected ray-tube footprint induced by the propagated GO fields, radiate the equivalent currents, coherently sum the contributions from the computed coherent and incoherent components of the scattered field for each projected ray-tube footprint, and trace a new ray for the reflected (and possibly transmitted) direction from each hit point in accordance with the multi-bounce ray tracing framework of SBR. The output from the augmented SBR model are a statistically viable instance of the total (i.e. incoherent plus coherent) EM fields associated with a given observation point 317 or angle. At 319, these fields may be coupled into a receiving antenna according to its EM characterization to determine a received signal with amplitude and phase. In one embodiment, further post-processing may depend upon receiving a coherent signal. Examples of such post-processing include but are not limited to range-Doppler image formation, ISAR image formation, angle-of-arrival processing, time-of-arrival processing, and wireless communication channel characterization.

Figure 4:
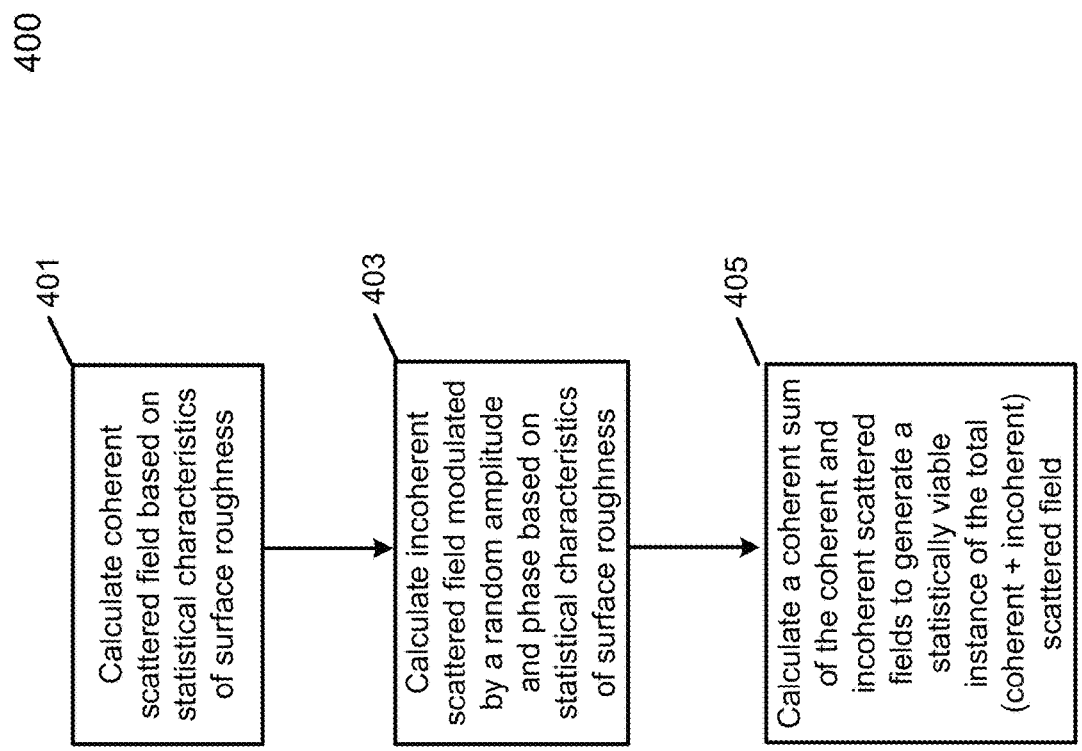
FIG. 4 illustrates a flow diagram of a method to simulate EM wave scattered by a rough surface model that coherently sums contributions from coherent and incoherent scattered fields computed based on a statistical characterization of surface roughness in accordance with one embodiment of the disclosure.

FIG. 4 illustrates a flow diagram of a method 400 to simulate EM wave scattered by a rough surface model that coherently sums contributions from coherent and incoherent scattered fields computed based on a statistical characterization of surface roughness in accordance with one embodiment of the disclosure.

In operation 401, the method 400 calculates a coherent component of a scattered field due to an incident EM field on the rough surface from a radiation source based on statistical parameters of surface roughness of the object. The surface roughness of the object may be characterized by statistical parameters such as the standard deviation $\sigma$ of surface height fluctuations and an autocorrelation function. The amplitude of the coherent component may be modeled by applying an attenuation factor to a scattered coherent field generated based on a flat surface. In one embodiment, the attenuation factor may be a function of the incident and scattered azimuth and polar angles, the wave number (i.e., angular frequency divided by speed of light), and the standard deviation $\sigma$ of surface height fluctuations. In one embodiment, the scalar attenuation factor may also be a function of the correlation length l. In one embodiment, the incident and scattered azimuth and polar angles, and the wave number may be represented as the incident and scattered wave vectors. The phase of the coherent component scattered from the rough surface may be unchanged to preserve the phase of the scattered coherent field generated based on the flat surface.

In operation 403, the method 400 calculates an incoherent component of the scattered field caused by the incident EM field on the rough surface based on the statistical parameters of the surface roughness of the object. The amplitude of the incoherent component may be modeled empirically, phenomenologically or computed based on the incident and scattered azimuth and polar angles, the wave number, standard deviation $\sigma$ and correlation length l of surface height fluctuations, and the EM properties of the surface materials. In one embodiment, the incident azimuth and polar angles, the scattered azimuth and polar angles, and the wave number may be represented as the incident and scattered wave vectors. The amplitude and phase of the incoherent component may then be modulated by random values, which in one embodiment, may be a drawn from a distribution that is a function of the incident GO fields, the incident and scattered polar angles, the incident and scattered azimuth angles, the geometry of the ray-tube footprints projected onto the rough surface by volumetric ray-tubes transporting the EM field from a radiation source, the statistical properties of the surface roughness, and the electrical properties of the surface materials.

In operation 405, the method 400 coherently sums the coherent and incoherent components of the scattered field to provide a statistically viable instance of the total (i.e. coherent plus incoherent) scattered fields. This summation effectively converts the incoherent field into a coherent mathematical representation, by assigning it a random phase, which is generated in operation 403. In one embodiment, the coherent summation of the coherent and incoherent field components of the scattered field calculated based on statistical characterization of surface roughness generates a statistically viable instance of the total (i.e. coherent plus incoherent) scattered field, which reproduces the mean and the variance of the power of the scattered fields observed from direct SBR simulation using an ensemble explicitly rendered rough surface geometry models.

Figure 5:
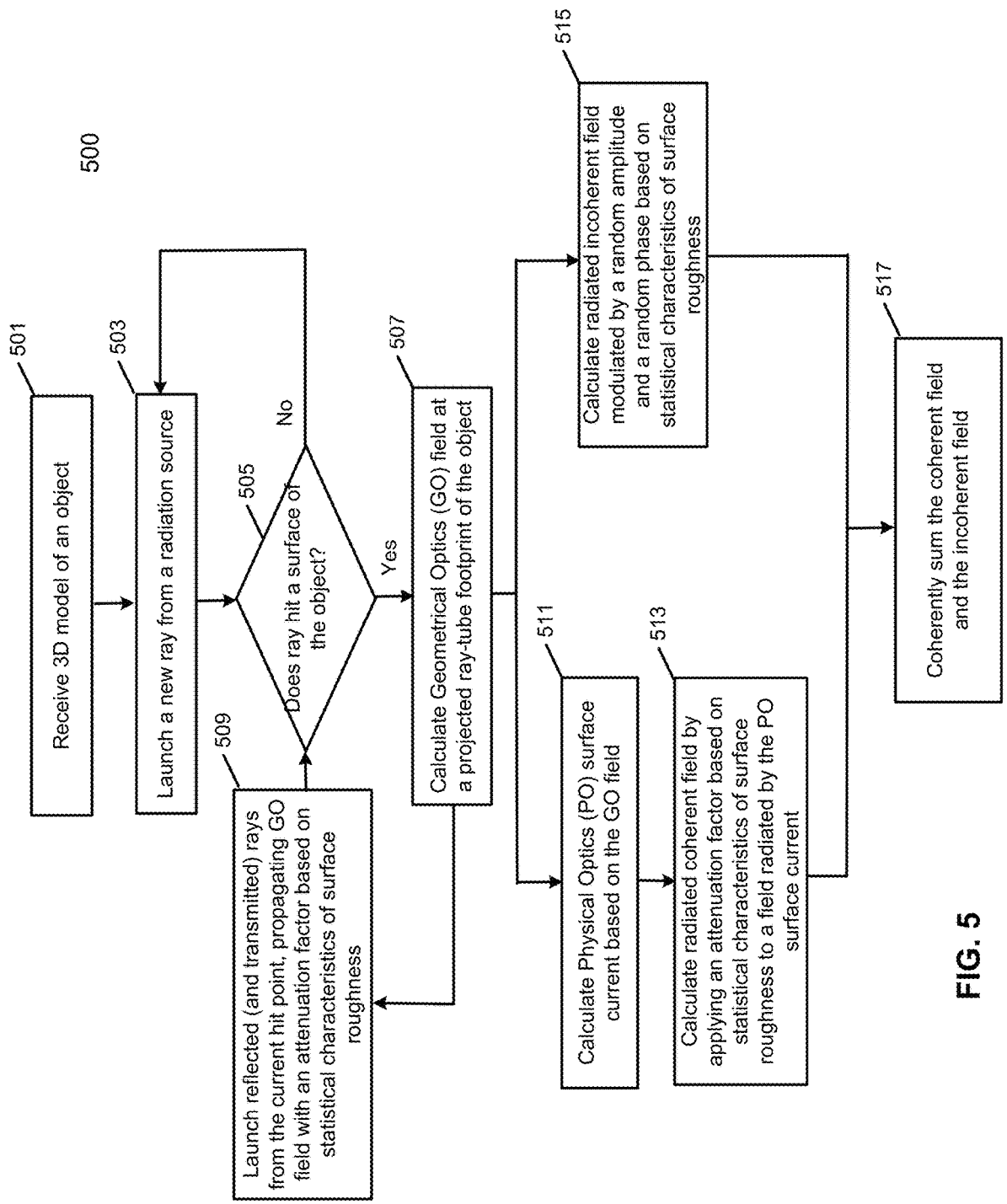
FIG. 5 illustrates a flow diagram of a method to generate a radar image of an object using the SBR technique augmented with a rough surface model that includes coherent and incoherent scattered fields computed based on a statistical characterization of surface roughness in accordance with one embodiment of the disclosure.

FIG. 5 illustrates a flow diagram of a method 500 to generate a radar image of an object using the SBR technique augmented with a rough surface model that includes coherent and incoherent scattered fields computed based on a statistical characterization of surface roughness in accordance with one embodiment of the disclosure.

In operation 501, the method 500 receives 3D CAD model of an object. In one embodiment, the 3D CAD model of an object may include the statistical characterizations of surface roughness of the object's surfaces, such as the standard deviations $\sigma$ and the autocorrelations l of surface height fluctuations, and the EM properties of the object's surface materials.

In operation 503, the method 500 launches a new volumetric ray-tube from a radiation source, such as a transmitting antenna or plane wave. In operation 505, the method 500 then determines whether the ray launched in operation 503 hits a surface of the object model. If a surface is hit, the volumetric ray-tube is projected onto the object surface by computing its projected ray-tube footprint. If no surface is hit, the method 500 returns to operation 503 to launch an additional ray until all rays are exhausted. In one embodiment, operation 503 may launch a plurality of volumetric ray-tubes and the associated rays from the radiation source. The plurality of volumetric ray-tubes may project a plurality of ray-tube footprints onto the object surface.

In operation 507, the method 500 calculates the incident, reflected and transmitted (for penetrable materials) geometrical-optics (GO) fields on the surface of the projected ray-tube footprint. In one embodiment, the incident, reflected and transmitted GO fields are computed at the ray hit point associated with the projected ray-tube footprint that is generated from the ray launched from the radiation source. In one embodiment, the incident, reflected and transmitted GO fields may be calculated for each one of the plurality of projected ray-tube footprints.

In operation 511, the method 500 calculates equivalent electric and magnetic currents of the projected ray-tube footprint from the GO fields according to the physical-optics (PO) approximation and the EM properties of the object's surface materials. In one embodiment, the equivalent electric and magnetic currents from the GO fields may be calculated for each one of the plurality of projected ray-tube footprints.

In operation 513, the method 500 calculates a coherent component of the scattered field from the projected ray-tube footprint based on statistical roughness characteristics of the object surface by applying a scalar attenuation factor to the field radiated by the equivalent PO currents on the projected ray-tube footprint. In one embodiment, the attenuation factor may be a function of the incident and scattered azimuth and polar angles, the wave number (i.e., angular frequency divided by speed of light), standard deviation $\sigma$ of surface height fluctuations, etc. In one embodiment, the attenuation factor may also be a function of the correlation length l. In one embodiment, the incident azimuth and polar angles, the scattered azimuth and polar angles, and the wave number may be represented as the incident and scattered wave vectors. The phase of the field radiated by the equivalent PO currents is unchanged by this attenuation factor to preserve the phase of the coherent component of the scattered field arising from the projected ray-tube footprint. In one embodiment, operation 513 may be repeated for each one of the plurality of projected ray-tube footprints.

In operation 515, the method 500 calculates an incoherent component of the scattered field from the projected ray-tube footprint based on the statistical roughness characteristics of the object surface by randomizing its amplitude and phase. In one embodiment, the randomized amplitude and phase may be a function of the GO fields computed in operation 507, the incident and scattered polar angles, the incident and scattered azimuth angles, the geometry of the projected ray-tube footprint, the statistical roughness characteristics of the object surface, and the EM properties of the surface materials. In one embodiment, the correlations of amplitude and phase for the incoherent field may be pre-computed across frequency bands and observation angles and subsequently interpolated over simulated frequencies and far-field observation angles. The amplitude of the incoherent component may be modeled analytically, empirically or phenomenologically, and then modulated by a random value which in general depends on the incident and scattered polar angles, the incident and scattered azimuth angles, the statistical characteristics of the surface roughness, and the EM properties of the surface material. In one embodiment, operation 515 may be repeated for each one of the plurality of projected ray-tube footprints.

In operation 509, the coherent component of the reflected and transmitted GO fields calculated in operation 507 is attenuated by applying an attenuation factor determined based on statistical roughness characteristics of the object surface. The attenuation factor may be calculated as in operation 513. The attenuated coherent reflected and transmitted GO fields are used to launch and trace new rays in the reflected and transmitted directions from the projected ray-tube footprint according to Snell's law. In one embodiment, in operation 505, the method 500 determines if the new ray hits a new surface of the object. If a new ray hits a surface of the object, the method 500 returns to operation 507 to propagate the attenuated GO reflected and possibly transmitted field to the ray hit point on that hit surface. The method 500 repeats operations 507, 5011, and 513, and 515 to compute the coherent and incoherent components of the scattered field from the new projected ray-tube footprint.

In operation 517, the method 500 coherently sums the coherent and the incoherent components of the scattered field to generate a statistically viable instance of the total (i.e. coherent plus incoherent) scattered field, which reproduces the mean and the variance of the power of the scattered fields observed from direct SBR simulation using an ensemble explicitly rendered rough surface geometry models. In one embodiment, the coherent and incoherent scattered fields arising from the projected ray-tube footprint may be coherently accumulated over a plurality of projected ray-tube footprints.

Figure 6:
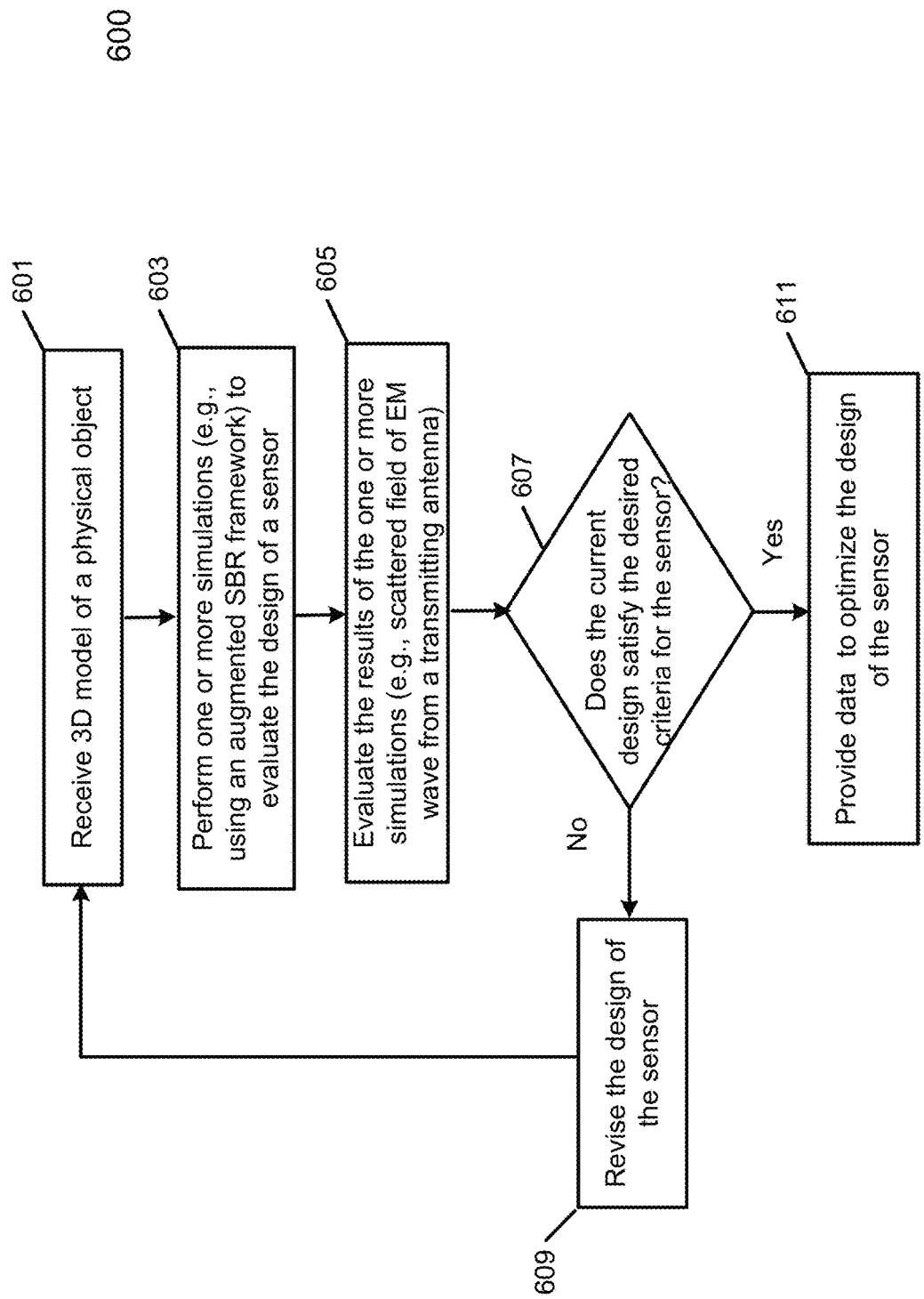
FIG. 6 illustrates a flow diagram of a method to design a physical object, such as the surface materials of an object, in accordance with one embodiment of the disclosure.

The embodiments described herein may be used to augment the SBR framework based on statistical roughness characteristics of objects to determine whether a particular design of a physical object or a physical system satisfies particular requirements for the object or system. For example, there may be certain design requirements for EM scattering effects of a physical object or physical system. FIG. 6 illustrates a flow diagram of a method 600 to optimize the performance of sensors such as receiving antennas operating in a scattering environment, in accordance with one embodiment of the disclosure. The method 600 may simulate the EM scattering effects of physical objects in the environment.

In operation 601, an EM simulation tool having the SBR model that is augmented with the rough surface scattering model as described by the embodiments of the disclosure may receive a 3D model for a physical object. The 3D model may be created in CAD software on a data processing system, and the 3D model may include the statistical roughness characteristics of the surface materials of the object.

In operation 603, the EM simulation tool may perform one or more simulations to generate simulation results to evaluate the design of a sensor. In one embodiment, the EM simulation tool may perform simulations using the 3D model of the physical object to generate the total scattered field from the physical object including the coherent sum of the coherent and incoherent components of the scattered field in response to a plane wave or a transmitting antenna.

In operation 605, the method 600 may evaluate the simulation results. For example, the method 600 may couple the total scattered field into a receiving antenna of the sensor and may post-process the received scattered field to generate results such as a range-Doppler image of the physical object, an ISAR image, angle-of-arrival characterization, time-of-arrival characterization, communication channel characterization, etc.

In operation 607, the method 600 may evaluate the simulation results to determine whether the design of the sensor satisfies certain desired performance criteria. For example, when designing the sensor, the method 600 may determine whether the power of the field scattered by the surface materials of the object in response to a radar and processed by the sensor satisfies certain desired design criteria.

If the criteria are satisfied, in operation 611, the method 600 may provide data to optimize the design of the sensor. If the criteria are not satisfied, the method 600 may revise the design in operation 609 (for example, by changing the design of the receiving antenna of the sensor) and may repeat operations 601, 603, 605, and 607 to perform further simulations to evaluate the redesigned sensor. These operations may be repeated until the desired criteria are achieved for the sensor, and may require the method 600 or a designer to change the design in terms of the hardware and software design of the sensor.

The methods and systems described herein may be implemented using any suitable processing system with any suitable combination of hardware, software and/or firmware, such as described below with reference to the non-limiting examples of FIGS. 7, 8A, 8B, and 8C.

Figure 7:
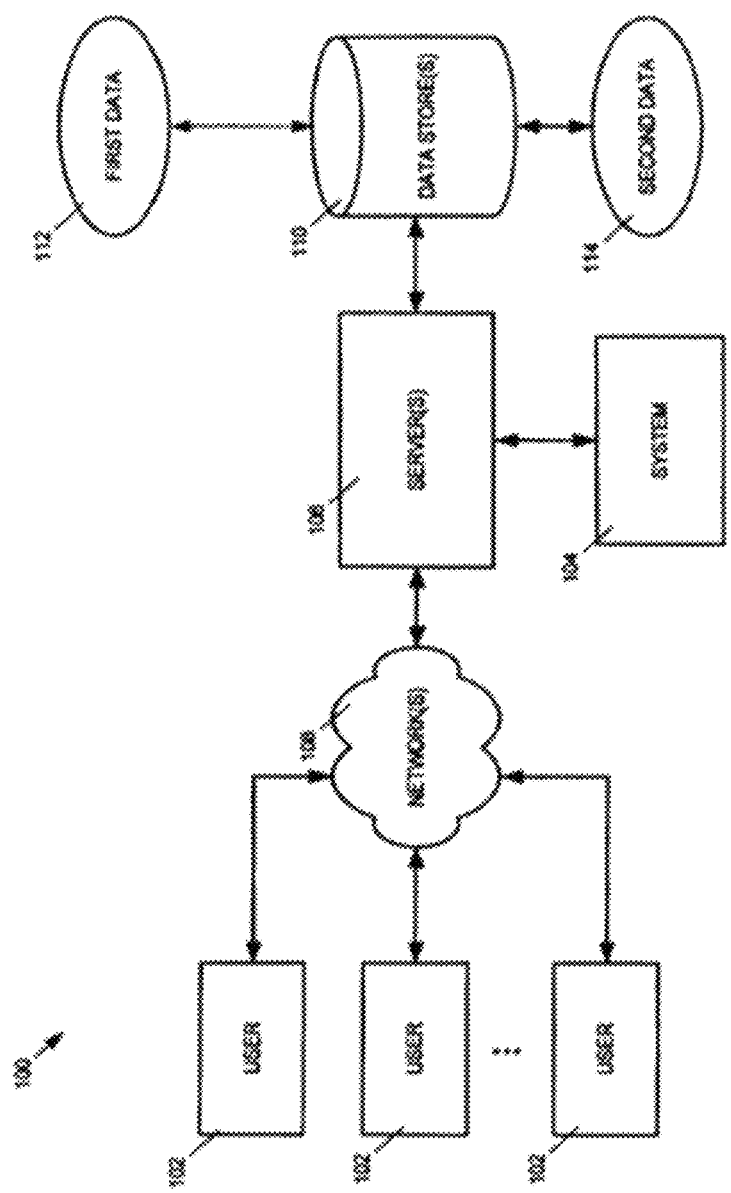

FIG. 7 depicts at 100 a computer-implemented environment wherein users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user.

Figure 8A:
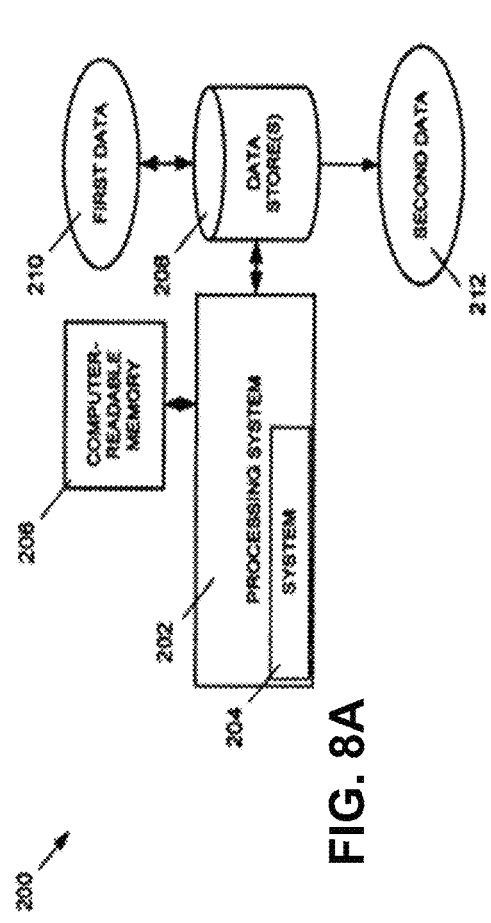
Figure 8B:
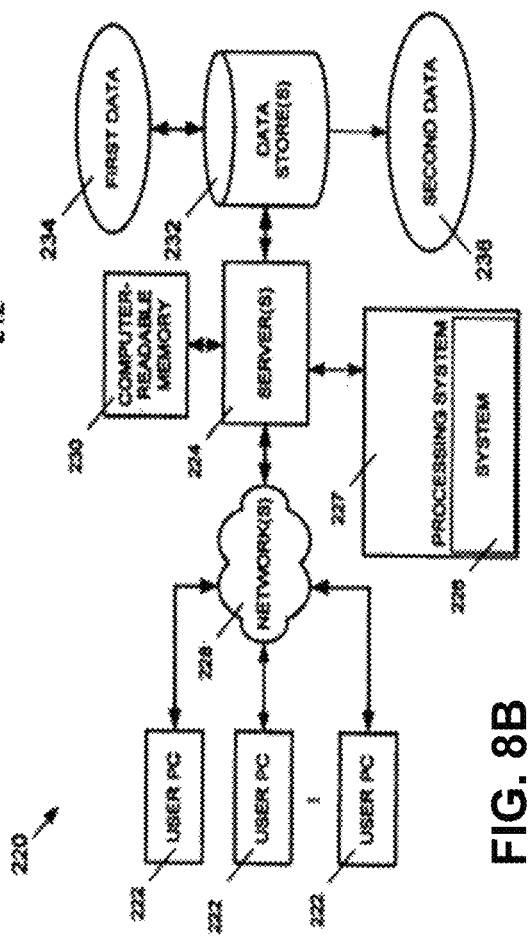

FIGS. 8A, 8B, and 8C depict example systems for use in implementing a system. For example, FIG. 8A depicts an exemplary system 200 that includes a standalone computer architecture where a processing system 202 (e.g., one or more computer processors) includes a system 204 being executed on it. The processing system 202 has access to a non-transitory computer-readable memory 206 in addition to one or more data stores 208. The one or more data stores 208 may contain first data 210 as well as second data 212.

FIG. 8B depicts a system 220 that includes a client server architecture. One or more user PCs 222 accesses one or more servers 224 running a system 226 on a processing system 227 via one or more networks 228. The one or more servers 224 may access a non-transitory computer readable memory 230 as well as one or more data stores 232. The one or more data stores 232 may contain first data 234 as well as second data 236.

FIG. 8C shows a block diagram of exemplary hardware for a standalone computer architecture 250, such as the architecture depicted in FIG. 8A that may be used to contain and/or implement the program instructions of system embodiments of the present disclosure. A bus 252 may serve as the information highway interconnecting the other illustrated components of the hardware. A processing system 254 labeled CPU (central processing unit) (e.g., one or more computer processors), may perform calculations and logic operations required to execute a program. A non-transitory computer-readable storage medium, such as read only memory (ROM) 256 and random access memory (RAM) 258, may be in communication with the processing system 254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 272.

In addition to the standard computer-type components, the hardware may also include data input devices, such as a keyboard 272, or other input device 274, such as a microphone, remote control, pointer, mouse, touchscreen and/or joystick.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A method for computer aided electromagnetic field (EM) simulation, comprising:
   simulating a projection of an EM field from a radiation source onto a surface of an object to form projected ray-tube footprints;
   calculating a coherent component of a scattered field due to the EM field incident on each of the projected ray-tube footprints based on statistical characteristics of surface roughness of the surface of the object by generating a coherent scattered field based on a flat surface of the object assuming radiation from surface currents having a constant magnitude and a linear phase progression defined over a ray-tube footprint, and attenuating an amplitude of the coherent scattered field by an attenuation factor to obtain the coherent component of the scattered field, wherein the attenuation factor is a function of the statistical characteristics of the surface roughness;
   calculating an incoherent component of the scattered field for each of the projected ray-tube footprints, the incoherent component being modulated by a random amplitude and a random phase based on the statistical characteristics of the surface roughness;
   coherently summing the coherent component and the incoherent component for each of the projected ray-tube footprints to generate a statistically viable instance of the scattered field that includes total contributions from the coherent component and the incoherent component; and
   processing the scattered field corresponding to each of the projected ray-tube footprints to represent an image of the object at an antenna based on coherently accumulating the scattered field over the projected ray-tube footprints.

2. The method of claim 1, wherein calculating the incoherent component of the scattered field comprises:
   computing the random amplitude and the random phase of the incoherent component based on the statistical characteristics of the surface roughness;
   calculating an amplitude of the incoherent component based on the random amplitude; and
   rendering the incoherent component in a mathematically coherent form by multiplying the incoherent component with the random phase.

3. The method of claim 2, wherein computing the random amplitude and the random phase of the incoherent component comprises:
   computing correlations of a plurality of random amplitudes and random phases of the incoherent component of the scattered field across a plurality of incident angles and scattered angles based on the statistical characteristics of the surface roughness; and
   interpolating the correlations of the plurality of random amplitudes and random phases of the incoherent component over a plurality of frequencies of the EM field and a plurality of observation angles of the scattered field to obtain the random amplitude and the random phase of the incoherent component.

4. The method of claim 1, wherein
   the flat surface of the object assuming radiation from surface currents having the constant magnitude and the linear phase progression across the flat surface is spatially constrained by a corresponding one of the projected ray-tube footprints.

5. The method of claim 1, wherein the statistical characteristics of the surface roughness comprise:
   a standard deviation of surface height fluctuations of the surface of the object; or
   an autocorrelation function representing a characteristic length of the surface height fluctuations across a horizontal length of the surface of the object.

6. The method of claim 1, wherein the projected ray-tube footprints are formed by simulating volumetric ray-tubes projected onto the surface of the object, and wherein the volumetric ray-tubes transports the EM field from the radiation source to the surface of the object.

7. The method of claim 6, wherein calculating the incoherent component of the scattered field comprises:
   computing the random amplitude and the random phase of the incoherent component radiated from the projected ray-tube footprint based on the statistical characteristics of the surface roughness, wherein the surface of the object comprises a plurality of the projected ray-tube footprints and wherein a mean field power of the incoherent component computed over the plurality of projected ray-tube footprints scales linearly with an aggregate area of the plurality of projected ray-tube footprints.

8. The method of claim 7, wherein the random amplitude and the random phase of the incoherent component are computed based a geometric optics (GO) field incident at the projected ray-tube footprint, a scattered azimuth angle and a scattered polar angle of a radiated EM field at the projected ray-tube footprint, an area of the projected ray-tube footprint, a standard deviation of surface height fluctuations of the surface of the object, and an autocorrelation function representing a characteristic length of the surface height fluctuations across a horizontal length of the surface of the object.

9. The method of claim 1, further comprising:
   computing a geometrical optics (GO) approximation based on the EM field incident on the surface of the object and based on EM properties of a material on the surface of the object; and
   computing a physical optics (PO) approximation of equivalent surface currents induced on the surface of the object based on the GO approximation,
   wherein the coherent component of the scattered field is calculated based on a radiated EM field radiated by the equivalent surface currents, an incident polar angle of the incident EM field, a scattered polar angle of the EM radiated field, and the statistical characteristics of the surface roughness, and
   wherein the incoherent component of the scattered field is calculated based on the GO approximation of the incident EM field, the incident polar angle of the incident EM field, an incident azimuth angle of the incident EM field, the scattered polar angle of the radiated EM field, a scattered azimuth angle of the radiated EM field, the EM properties of the material on the surface of the object, a geometry of a projected ray-tube footprint of a volumetric ray-tube that transports the EM field from a radiation source to the surface of the object, and the statistical characteristics of the surface roughness.

10. The method of claim 9, further comprising:
    propagating a coherent component of the GO approximation attenuated based on the statistical characteristics of the surface roughness in accordance with a multi-bounce ray tracing model of a shooting and bouncing ray (SBR) framework.

11. A system, comprising:
a processor; and
a memory coupled to the processor to store instructions, which when executed by the processor, cause the processor to perform operations, the operations comprising:
  simulating a projection of an electromagnetic field (EM) from a radiation source onto a surface of an object to form projected ray-tube footprints;
  calculating a coherent component of a scattered field due to the EM field incident on each of the projected ray-tube footprints based on statistical characteristics of surface roughness of the surface of the object by generating a coherent scattered field based on a flat surface of the object assuming radiation from surface currents having a constant magnitude and a linear phase progression defined over a ray-tube footprint, and attenuating an amplitude of the coherent scattered field by an attenuation factor to obtain the coherent component of the scattered field, wherein the attenuation factor is a function of the statistical characteristics of the surface roughness;
  calculating an incoherent component of the scattered field for each of the projected ray-tube footprints, the incoherent component being modulated by a random amplitude and a random phase based on the statistical characteristics of the surface roughness;
  coherently summing the coherent component and the incoherent component for each of the projected ray-tube footprints to generate a statistically viable instance of the scattered field that includes total contributions from the coherent component and the incoherent component; and
  processing the scattered field corresponding to each of the projected ray-tube footprints to represent an image of the object at an antenna based on coherently accumulating the scattered field over the projected footprints.

12. The system of claim 11, wherein the processor calculating the incoherent component comprises the processor:
  computing the random amplitude and the random phase of the incoherent component based on the statistical characteristics of the surface roughness;
  calculating an amplitude of the incoherent component based on the random amplitude; and
  rendering the incoherent component in a mathematically coherent form by multiplying the incoherent component with the random phase.

13. The system of claim 12, wherein the processor computing the random amplitude and the random phase of the incoherent component comprise the processor:
  computing correlations of a plurality of random amplitudes and phases of the incoherent component of the scattered field across a plurality of incident angles and scattered angles based on the statistical characteristics of the surface roughness; and
  interpolating the correlations of the plurality of random amplitudes and random phases of the incoherent component over a plurality of frequencies of the EM field and a plurality of observation angles of the scattered field to obtain the random amplitude and the random phase of the incoherent component.

14. The system of claim 11, wherein
the flat surface of the object assuming radiation from surface currents having the constant magnitude and the linear phase progression across the flat surface is spatially constrained by a corresponding one of the projected ray-tube footprints.

15. The system of claim 11, wherein the statistical characteristics of the surface roughness comprise:
  a standard deviation of surface height fluctuations of the surface of the object; or
  an autocorrelation function representing a characteristic length of the surface height fluctuations across a horizontal length of the surface of the object.

16. The system of claim 11, wherein the projected ray-tube footprints are formed by simulating volumetric ray-tubes projected onto the surface of the object, and wherein the volumetric ray-tubes transports the EM field from the radiation source to the surface of the object.

17. The system of claim 16, wherein the processor calculating the incoherent component of the scattered field comprises the processor:
  computing the random amplitude and the random phase of the incoherent component radiated from the projected ray-tube footprint based on the statistical characteristics of the surface roughness, wherein the surface of the object comprises a plurality of the projected ray-tube footprints and wherein a mean field power of the incoherent component computed over the plurality of projected ray-tube footprints scales linearly with an aggregate area of the plurality of projected ray-tube footprints.

18. The system of claim 17, wherein the random amplitude and the random phase of the incoherent component are computed by the processor based on a geometric optics (GO) field incident at the projected ray-tube footprint, a scattered azimuth angle and a scattered polar angle of a radiated EM field at the projected ray-tube footprint, an area of the projected ray-tube footprint, a standard deviation of surface height fluctuations of the surface of the object, and an autocorrelation function representing a characteristic length of the surface height fluctuations across a horizontal length of the surface of the object.

19. The system of claim 11, wherein the processor further performs operations comprising:
  computing a geometrical optics (GO) approximation based on the EM field incident on the surface of the object and based on EM properties of a material on the surface of the object; and
  computing a physical optics (PO) approximation of equivalent surface currents induced on the surface of the object based on the GO approximation,
  wherein the coherent component of the scattered field is calculated by the processor based on a radiated EM field radiated by the equivalent surface currents, an incident polar angle of the incident EM field, a scattered polar angle of the radiated EM field, and the statistical characteristics of the surface roughness,
  and wherein the incoherent component of the scattered field is calculated by the processor based on the GO approximation of the incident EM field, the incident polar angle of the incident EM field, an incident azimuth angle of the incident EM field, the scattered polar angle of the radiated EM field, a scattered azimuth angle of the radiated EM field, the EM properties of the material on the surface of the object, a geometry of a projected ray-tube footprint of a volumetric ray-tube that transports the EM field from a radiation source to the surface of the object, and the statistical characteristics of the surface roughness.

20. The system of claim 19, wherein the processor further performs operations comprising:
propagating a coherent component of the GO approximation attenuated based on the statistical characteristics of the surface roughness in accordance with a multi-bounce ray tracing model of a shooting and bouncing ray (SBR) framework.

21. A non-transitory computer-readable medium having instructions stored therein, which when executed by a processor, cause the processor to perform operations, the operations comprising:
simulating a projection of an electromagnetic field (EM) from a radiation source onto a surface of an object to form projected ray-tube footprints;
calculating a coherent component of a scattered field due to the EM field incident on each of the projected ray-tube footprints based on statistical characteristics of surface roughness of the surface of the object by generating a coherent scattered field based on a flat surface of the object assuming radiation from surface currents having a constant magnitude and a linear phase progression defined over a ray-tube footprint, and attenuating an amplitude of the coherent scattered field by an attenuation factor to obtain the coherent component of the scattered field, wherein the attenuation factor is a function of the statistical characteristics of the surface roughness;
calculating an incoherent component of the scattered field for each of the projected ray-tube footprints, the incoherent component being modulated by a random amplitude and a random phase based on the statistical characteristics of the surface roughness;
coherently summing the coherent component and the incoherent component for each of the projected ray-tube footprints to generate a statistically viable instance of the scattered field that includes total contributions from the coherent component and the incoherent component; and
processing the scattered field corresponding to each of the projected ray-tube footprints to represent an image of the object at an antenna based on coherently accumulating the scattered field over the projected ray-tube footprints.

22. The non-transitory computer-readable medium of claim 21, wherein the operation of calculating the incoherent component comprises
computing the random amplitude and the random phase of the incoherent component based on the statistical characteristics of the surface roughness;
calculating an amplitude of the incoherent component based on the random amplitude; and
rendering the incoherent component in a mathematically coherent form by multiplying the incoherent component with the random phase.

23. The non-transitory computer-readable medium of claim 21, wherein
the flat surface of the object assuming radiation from surface currents having the constant magnitude and the linear phase progression across the flat surface is spatially constrained by a corresponding one of the projected ray-tube footprints.

24. The non-transitory computer-readable medium of claim 21, wherein the statistical characteristics of the surface roughness comprise:
a standard deviation of surface height fluctuations of the surface of the object; or
an autocorrelation function representing a characteristic length of the surface height fluctuations across a horizontal length of the surface of the object.

25. The non-transitory computer-readable medium of claim 21, wherein the instructions when executed by the processor cause the processor to perform operations that further comprise:
computing a geometrical optics (GO) approximation based on the EM field incident on the surface of the object and based on EM properties of a material on the surface of the object;
computing a physical optics (PO) approximation of equivalent surface currents induced on the surface of the object based on the GO approximation; and
propagate a coherent component of the GO approximation based on the statistical characteristics of the surface roughness in accordance with a multi-bounce ray tracing model of a shooting and bouncing ray (SBR) framework,
wherein the coherent component of the scattered field is calculated based on a radiated EM field radiated by the equivalent surface current, an incident polar angle of the incident EM field, a scattered polar angle of the radiated EM field, and the statistical characteristics of the surface roughness,
and wherein the incoherent component of the scattered field is calculated based on the GO approximation of the incident EM field, the incident polar angle of the incident EM field, an incident azimuth angle of the incident EM field, the scattered polar angle of the radiated EM field, a scattered azimuth angle of the radiated EM field, the EM properties of the material on the surface of the object, a geometry of a projected ray-tube footprint of a volumetric ray-tube that transports the EM field from a radiation source to the surface of the object, and the statistical characteristics of the surface roughness.

* * * * *